3,358,016
PREPARATION OF ALKENYL ESTERS FROM ALKENYL CHLORIDES AND METAL CARBOXYLATES IN THE PRESENCE OF PALLADOUS CHLORIDE

Charles F. Kohll and Robert van Helden, Amsterdam, Netherlands, assignors to Shell Oil Company, New York, N.Y., a corporation of Delaware
No Drawing. Filed Mar. 18, 1964, Ser. No. 352,956
Claims priority, application Netherlands, Mar. 20, 1963, 290,408
6 Claims. (Cl. 260—491)

This invention relates to a process for the preparation of vinyl compounds.

In a strictly non-aqueous medium a vinyl group can be added to negative portions of compounds having an active hydrogen and a nucleophilic anion, such as alkoxy, aryloxy, cyano, amino, amido carboxylate, cyanide, isocyanide, carbonate, and corresponding thio compounds. Generally, such a reaction is catalyzed by palladium chloride and can be represented by the equation

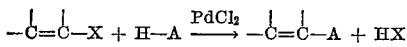

wherein X is halogen and A is one of the nucleophilic anions referred to above. (French patent specification 1,310,755.)

In the above-referenced process, the active hydrogen on the H—A compound combines with the halogen atom from the vinyl halide. This hydrogen halide formation is extremely detrimental to the reaction. The undesirable effects of the presence of the hydrogen halide can be diminished to some extent by providing suitable acceptors, such as disodium hydrogen phosphate to reduce the concentration of the hydrogen halide in the reaction zone. However, even the presence of these acceptors will not substantially improve the low yields nor reduce the extended reaction period necessary for such a process. Therefore, the foregoing described process has extremely limited commercial application.

Another commercially acceptable process for preparing vinyl compounds, such as vinyl carboxylates, is by reacting acetylene with the compound having an active hydrogen (e.g., carboxylic acid) to which the vinyl group is to be added, for example, vinyl acetate is commercially prepared by reacting acetic acid with acetylene at elevated temperatures in the preesence of a catalyst. However, other better methods of preparing vinyl compounds have been sought.

It is a principal object of the present invention to provide an improved process which is commercially acceptable for the addition of vinyl moieties to organic and inorganic nucleophilic anions.

A more specific object is to provide a new commercially attractive process for the preparation of alkenyl esters.

The above objects, as well as others which will appear from the descripition of the invention, were surprisingly achieved by reacting vinyl halide with organic and inorganic metallic salts in an inert liquid phase and in the presence of a metal halide catalyst at temperatures and pressures sufficient to effect the addition of the vinyl moiety to the anion of the metallic salt.

While it is known that vinylic halogens have high resonance stabilization and are therefore unreactive, this invention is able to accomplish its objects because of the discovery that certain metallic halides effectively reduce this relatively high resonance stabilization and cause such halo-substituted vinyl residues to be more reactive.

Not all metallic halides reduce this high resonance stability of halo-substituted vinyl residues. Only the halides of the metals of Group VIII of the Periodic Table having an atomic number of at least 44 and specifically rutheni-um, rhodium, palladium, osmium, iridium and platinum, are effective catalysts for this process. This group of metals of the Periodic Table will hereinafter be referred to as the "precious metals" of Group VIII for purposes of convenience. The most preferred precious metal halide catalyst is the chloride and the most preferred catalyst for the process is palladium chloride.

Only catalytic amounts of these precious metal halides are necessary to effect the process and the preferred ratio is not greater than 1:500 mol of precious metal halide to the stoichiometric mol amount of the reactants. However, it was found that it was necessary to have a mol ratio of at least 1:1000 for the reaction to be operable.

Vinyl halides which are operable in the invention are limited to those having from 2 to 4 carbon atoms and can be mono- or polyhalides.

These $C_2$ to $C_4$ compounds have the general formula

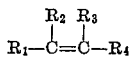

wherein $R_1$, $R_2$, $R_3$ and $R_4$ are independently selected from halogen, hydrogen, methyl and ethyl with at least one of them being halogen. Examples of such classes of compounds are vinyl halide, 1,1-dihaloethylene, 1,2-dihaloethylene, 2-halopropylene, 1-halobutene-1, 2-halobutene-2, and the like as well as halogenated diolefins such as chloroprene. It is preferred that the vinylic halogen is chlorine, but both fluorine and bromine are effective with iodine somewhat less desirable.

The vinyl halides are reacted with salts of the type

wherein M is a metallic atom and A is an organic or inorganic nucleophilic anion. In compounds of this type, the metallic portion can be selected from a wide variety of elements including some which are amphoteric. The selection of the metallic portion of this compound is generally based on the economies of obtaining them and a preferred group is copper, zinc, silver, cadmium, boron, aluminum, iron, cobalt, titanium, zirconium, scandium, lead, molybdenum, tin, bismuth, antimony, chromium, alkali metals, and alkaline earth metals.

In the above group, the alkali metals are preferred, particularly sodium and potassium. Mixtures of the metal compounds can also be used.

Organic and inorganic nucleophilic anions represented by A are somewhat more restricted. In the organic group of anions are cyanates, isocyanates, cyanides, amines, carboxylates, alcoholates, and the corresponding thio compounds. The organic moiety can contain from 2 to 18 carbon atoms with the preferred anions being $C_2$ to $C_{18}$ carboxylates. Specifically, the saturated aliphatic $C_2$ to $C_{18}$ monocarboxylates are the more preferred and particularly desirable are those in which the carboxyl group is attached to a tertiary or quaternary carbon atom. Anions, exemplary of those useful in this new process are the metallic salts of acetic, propionic, butyric, beta,beta-dimethylglycidic, pivalic, palmitic, stearic, benzoic, succinic, adipic, phthalic and terephthalic acids.

Inorganic anions which will accept the vinyl moiety according to this invention are carbonates, phosphates and sulfonates.

In general, the reaction between the two reactants can be illustrated by

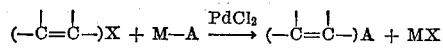

wherein X is halogen and M and A have the significance attributed to them above.

A liquid phase reaction is necessary according to the invention to achieve its rather surprising results and it is preferred that it be substantially water-free (i.e., containing not more than 10% by weight of water). It is generally desirable to maintain the water content at 5% or lower by weight to prevent the formation of by-products, such as the carbonyl compound. Serving as the most preferred reaction media are the aprotic liquids, such as liquid sulfur dioxide, dimethyl sulfoxide, acetone, methyl ethyl ketone, dimethylformamide, acetonitrile, 1,2-dimethoxyethane, tetrahydrofuran, sulfolane, ethyl acetate and similar aprotic liquids selected from ketones, nitriles, ethers and hydrocarbons.

Of these substances, outstanding results were achieved when dimethylformamide was used as the aprotic liquid reaction medium.

The critical pressures of the reaction have a reasonably broad range from 0.1 to 200 atmospheres depending largely upon the reactants employed and the liquid reaction medium selected. Where one of the reactants is gaseous at atmospheric pressure, the use of pressure will be advantageous to effect liquefaction and/or increase the concentration of the gaseous reaction in the liquid reaction medium to achieve good reactions velocities. Pressures between 5 and 120 atmospheres are preferable.

Temperatures in the reaction zone should be controlled within the tolerances of 0° to 150° C. and more preferably between 20° and 100° C. Many of the undesirable side-reactions are avoided, particularly when preparing vinyl esters according to this invention, when the temperature in the reaction zone is limited from 30° to 85° C.

Since the reaction carried out according to this invention shows good selectivities and good yields when stoichiometric amounts of the reactants are employed, there is no particular advantage in using an excess of one or the other.

Probably a critical feature responsible for the rather surprising yields in selectivities of the instant process is that the process requires that compounds of the type $$H\text{---}A$$

wherein A represents the nucleophilic anions indicated earlier, must be less than 2% by weight of the reaction mixture and preferably less than 0.5% of the reaction mixture by weight. The detrimental effects of the presence of such compounds can be seen in Example II, which is not part of the invention, but is included for purposes of illustration and comparison. Along these same lines, it is important that the pH of the reaction mixture be at least 4 and preferably greater since lower pH values will reduce the yield appreciably.

Some special advantages may be gained by adding promotors to the reaction medium. In particular, the halide salts of the alkali metals not only promote the reaction but also increase the solubility of M---A compounds enhancing the attractiveness of the process. In proportions of 0.1 to 200 mol % calculated on the amount of M---A compound they are most effective.

When these above-described reaction conditions are maintained within the appropriate parameters, the instant process proceeds smoothly and efficiently as a result of their synergistic effects. Examples I and III–VI are amply illustrative of the invention while Example II is included to demonstrate the importance of carrying out the reaction as described according to the invention. However, it is not intended that the invention be limited in any way by the examples.

Example I

In a 200 ml. reaction vessel 2.05 mol of dimethylformamide was saturated with vinyl chloride at a temperature of 65° C. Then 0.040 mol of palladium acetate was added. The reaction set in and vinyl chloride was again absorbed in the reaction mixture.

After 13 minutes, 60 millimoles (mmol) of vinyl chloride had been absorbed. No further vinyl chloride was introduced into the mixture whereupon the reaction stopped.

By analysis of the reaction product obtained, it was found that vinyl acetate and acetaldehyde had been formed in a yield of 62 and 16.5% m respectively, calculated on absorbed vinyl chloride.

Example II (for comparison only, not according to the invention)

Under otherwise similar conditions as described in Example I an experiment was performed in which instead of dimethylformamide 2.5 mol of acetic acid was used as solvent.

After a reaction period of 3 hours, 16 mmols of vinyl chloride were absorbed. Then the rate of absorption increased suddenly until after a total reaction time of 3¾ hours no further vinyl chloride absorption could be observed; 80 mmols of the halide was then incorporated in the mixture.

The reaction product obtained comprised 17% m of vinyl acetate, 4% m acetaldehyde, 3% m ethylidene diacetate, all calculated on absorbed vinyl chloride and 2 grams of a high-boiling tarry product.

Example III

Into a solution of 0.2 mol of sodium acetate in 2.05 mol of dimethylformamide vinyl chloride was passed at 65° C. until the solution was saturated with this gas. Subsequently, 1 gram palladium chloride was added upon which the reaction set in, vinyl chloride being absorbed in the mixture again. After 30 minutes, 115 mmols vinyl chloride had been absorbed.

The reaction was continued during another 5½ hours the quantity of absorbed vinyl chloride amounted then to 200 mmols.

The reaction product obtained comprised vinyl acetate in a quantity corresponding with a yield of 65% m calculated on absorbed vinyl chloride.

Example IV

Under otherwise the same conditions as were described in Example III, an experiment was carried out in which the reaction mixture comprised additionally 0.171 mol of iron acetate and 0.034 mol of lithium chloride.

It was observed that 165 mmols of vinyl chloride had been incorporated in the mixture in 30 minutes.

After a total reaction time of 60 minutes, the reaction was stopped by ceasing the introduction of vinyl chloride into the mixture, the total amount of absorbed vinyl chloride then being 174 mmole.

The amount of vinyl acetate formed in the reaction corresponded with a yield of 97% m calculated on absorbed vinyl chloride.

Example V

A 300 ml. shaking autoclave contained a mixture of 0.028 mol palladium chloride and 0.088 mol anhydrous cupric acetate in 1.37 mol dimethylformamide.

At —20° C. 46 gram vinyl chloride was added. Subsequently, the autoclave was closed and the temperature of the mixture was raised to 75° C. The pressure in the autoclave rose to 6 atmosphere.

After 3 hours, the mixture was cooled to 20° C. and the excess of vinyl chloride was evaporated. The solid salts were then filtered off and the mixture was subjected to a fractionated distillation at reduced pressure.

From the fractions thus obtained, 0.110 mol vinyl acetate and 0.008 mol acetaldehyde were isolated.

In a similar experiment, in which was started from the same quantities of palladium chloride, cupric acetate and vinyl chloride, but in which acetic acid instead of dimethylformamide was used as the solvent, only traces of vinyl acetate and acetaldehyde could be detected.

Example VI

A stirring autoclave contained 13.8 parts by weight of the sodium salt of beta,beta-dimethylglycidic acid, 20 parts by weight of vinyl chloride, 0.50 part by weight of palladium chloride, 0.086 part by weight of ferric acetate, 0.017 part by weight of lithium chloride and 75 parts by weight of 1,2-dimethoxyethane.

After closing the autoclave, the mixture was heated at 62° C. for 16 hours while stirring.

Subsequently, the mixture was cooled to 20° C.

By analysis of the reaction product, it has been shown that 80%m of the sodium carboxylate had been converted.

The solvent was distilled off and the vinyl ester was subjected to a fractionated distillation at 30° C./2 mm.

The yield was 60% on converted sodium salt.

We claim as our invention:

1. A process for preparing vinyl esters by reacting a $C_2$ to $C_4$ vinylic halide having the formula

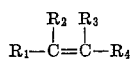

wherein $R_1$, $R_2$, $R_3$ and $R_4$ are selected from the group consisting of halogen, hydrogen, methyl and ethyl provided that at least one of them is halogen, with a sodium, iron or copper salt of a saturated aliphatic $C_2$ to $C_{18}$ monocarboxylate in a substantially anhydrous inert liquid medium selected from the group consisting of dimethylformamide and 1,2-dimethoxyethane in the presence of palladium chloride catalyst at a temperature from 0° to 150° C. and at a pH of at least 4 in the substantial absence of free saturated aliphatic monocarboxylic acid.

2. A process according to claim 1 in which the vinylic halide is vinyl chloride.

3. A process according to claim 2 in which the saturated aliphatic monocarboxylate is acetate.

4. A process according to claim 1 in which the palladium chloride catalyst is present in a ratio from 1:1000 to 1:500 mol of palladium chloride to the stoichiometric mol amount of reactants.

5. A process according to claim 3 in which the process is conducted at a temperature from 20° to 100° C.

6. A process according to claim 5 in which the salt of the carboxylate is sodium acetate.

References Cited

UNITED STATES PATENTS 3,173,958  3/1965  Milgrom et al. _____ 260—614
3,227,747  1/1966  Lum et al. _____ 260—497

FOREIGN PATENTS 1,310,755  10/1962  France.

LORRAINE A. WEINBERGER, *Primary Examiner.*

V. GARNER, *Assistant Examiner.*